United States Patent [19]

Coté

[11] Patent Number: 4,516,056
[45] Date of Patent: May 7, 1985

[54] CAPACITIVELY BALLASTED LOW VOLTAGE INCANDESCENT LAMP

[75] Inventor: Paul T. Coté, Cleveland Heights, Ohio

[73] Assignee: General Electric Company, Schenectady, N.Y.

[21] Appl. No.: 630,360

[22] Filed: Jul. 16, 1984

Related U.S. Application Data

[63] Continuation-in-part of Ser. No. 379,411, May 18, 1982, abandoned.

[51] Int. Cl.³ .................. H05B 37/00; H05B 39/00; H05B 41/14
[52] U.S. Cl. .................. 315/240; 315/227 R; 315/291; 315/311; 315/DIG. 4; 323/209; 363/62
[58] Field of Search .................. 315/227 R, 240, 291, 315/307, 311, DIG. 4; 307/109; 363/62, 211, 142; 323/209–211, 293, 352, 364, 370

[56] References Cited

U.S. PATENT DOCUMENTS

| | | | |
|---|---|---|---|
| 2,654,042 | 9/1953 | Clarke et al. | 315/58 |
| 3,274,484 | 9/1966 | Gebhardt et al. | 315/240 X |
| 3,530,370 | 9/1970 | Yamachi et al. | 323/210 |
| 3,597,652 | 8/1971 | Gates, Jr. | 315/293 |
| 3,921,032 | 11/1975 | Hallay | 315/106 |
| 4,185,231 | 1/1980 | Colliton | 315/189 |
| 4,185,233 | 1/1980 | Riesland et al. | 315/276 |
| 4,234,843 | 11/1980 | Gyugyi et al. | 323/119 |

FOREIGN PATENT DOCUMENTS

| | | |
|---|---|---|
| 0208114 | 12/1955 | Australia ............ 315/291 |
| 53-2970 | 1/1978 | Japan ............ 315/291 |
| 335618 | 9/1930 | United Kingdom . |
| 397000 | 8/1933 | United Kingdom . |
| 637408 | 5/1950 | United Kingdom . |
| 1329492 | 9/1973 | United Kingdom . |
| 1350176 | 4/1974 | United Kingdom . |
| 1415634 | 11/1975 | United Kingdom . |
| 1555366 | 11/1979 | United Kingdom . |
| 1567749 | 5/1980 | United Kingdom . |
| 2077528 | 12/1981 | United Kingdom . |

OTHER PUBLICATIONS

*SCR Manual Including Triacs and Other Thyristors*, (6th Ed.), General Electric Company, (1979), pp. 231, 232.

*Primary Examiner*—Saxfield Chatmon
*Attorney, Agent, or Firm*—John P. McMahon; Philip L. Schlamp; Fred Jacob

[57] ABSTRACT

A capacitively ballasted low voltage lamp utilizing a main capacitor connected electrically in series with the lamp, across an alternating current source, and one or more auxiliary capacitors that can be connected electrically across the main capacitor by switching means for one or more source waveform cycles. Each switching means comprises a unidirectional conductive device electrically connected in parallel with an active switching device. The minimum lamp current is established by the main capacitor, with additional lamp current flowing through one or more auxiliary capacitors during a source waveform cycle or integral multiples thereof.

7 Claims, 2 Drawing Figures

CAPACITIVELY BALLASTED LOW VOLTAGE INCANDESCENT LAMP

This application is a continuation-in-part of application Ser. 379,411, filed May 18, 1982, now abandoned.

CROSS-REFERENCE TO RELATED APPLICATIONS

U.S. patent application Ser. No. 379,412, F. F. Ahlgren, filed concurrently herewith for "Capacitively Ballasted Low Voltage Incandescent Lamp" and assigned the same as this invention, now abandoned.

U.S. patent application Ser. No. 379,410, Paul T. Coté, filed concurrently herewith for "Power Supply for Low Voltage Incandescent Lamp" and assigned the same as this invention, now U.S. Pat. No. 4,447,765.

U.S. patent application Ser. No. 379,393, William P. Kornrumpf and Paul T. Cot/é, filed concurrently herewith, for "Improved Power Supply For Low Voltage Incandescent Lamp and Like Load" and assigned the same as this invention, now U.S. Pat. No. 4,447,764.

BACKGROUND OF THE INVENTION

The present application relates to ballast means and more particularly to a capacitively ballasted circuit providing low voltage to an incandescent lamp.

As is well known in the art, incandescent lamps operating at a nominal voltage of approximately 120 volts do not provide as high an efficacy, that is lumens per watt, at the same wattage as incandescent lamps operating at lower voltage levels. Prior art circuitry providing such lower voltage operation either exhibits undesirable cost, volume, weight or high levels of electromagnetic interference. In particular, some prior art low voltage power supplies for incandescent lamps have utilized magnetic components for voltage transformation. The cost of such magnetic components has prevented the resulting power supplies from being economically attractive. Other power supplies have utilized phase-control techniques, in which very narrow pulses are required, with high surge currents flowing through the load; frequently resulting in electromagnetic interference and reduced reliability.

As disclosed in cross-referenced application 379,412, a capacitively ballasted incandescent lamp comprising a main capacitor in series with an incandescent lamp load and one or more auxiliary capacitors, electrically connected in parallel with the main capacitor, avoids the problems described heretofore. However the switching means, such as a triac, disclosed therein, which switch each additional capacitor electrically in parallel with the main capacitor, has several disadvantages including a higher cost and lower maximum operating temperature than is desired.

SUMMARY OF THE INVENTION

In accordance with the foregoing, objects of the present invention are to provide a new and improved switching means for a capacitively ballasted low voltage incandescent lamp having a relatively low cost and a relatively high maximum operating temperature.

These and other objects are provided by the present invention having switching means which electrically connect one or more auxiliary capacitors in parallel with a main capacitor, as disclosed in cross-referenced U.S. patent application Ser. No. 379,412, incorporated herein by reference thereto. More specifically, each switching means comprises a unidirectional conductive device electrically in parallel with an active switching device, each combination thereof electrically in series with an auxiliary capacitor. Additionally, each active switching device in a preferred embodiment is responsive to a signal provided by a control logic means.

DETAILED DESCRIPTION

Figure 1:
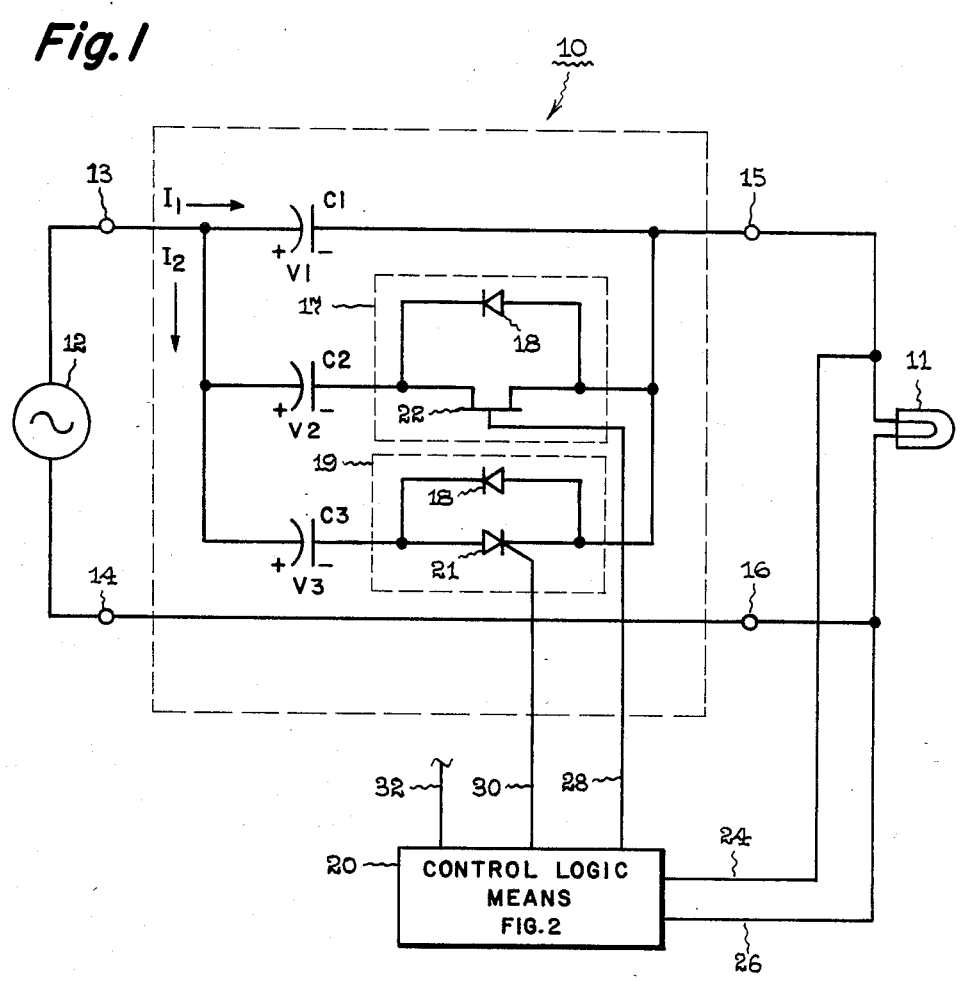
FIG. 1 is a schematical diagram of a capacitively ballasted low voltage incandescent lamp incorporating the present invention.

As shown in FIG. 1 a ballast means 10 provides power to a load 11, preferably an incandescent lamp, from an alternating current (a.c.) source 12 by controlling the current supplied to the load 11 from the a.c. source 12. Load 11 can be a low-voltage incandescent lamp operating at a voltage of, for example, between about twenty-four to thirty-six volts. The ballast means 10 enables the lamp load 11 to operate at a selectably fixed power output in a relatively small range of brightness. In such application, a relatively small range of lamp voltage can be maintained while the a.c. source 12 current is varied over a predetermined range, for example about 20%.

Ballast means 10 forms a capacitive voltage converter in which a minimum current flowing through the lamp is the current $I_1$ flowing through capacitor C1 hereinafter referred to as the main capacitor. An additional component of lamp current is due to the current $I_2$ flowing through one or more capacitors C2 and C3 hereinafter referred to as the auxiliary capacitors. Thus, minimum lamp current and power occur when current does not flow through the auxiliary capacitors C2 and C3, that is, when the capacitive reactance of ballast means 10 is a maximum. Conversely, maximum lamp current and power occur when the capacitor current $I_2$ flows through all the auxiliary capacitors C2 and C3 resulting in a minimal ballast means capacitive reactance. An intermediate magnitude of lamp current and power is obtained when the current $I_2$ flows through some but not all of the auxiliary capacitors C2 and C3. Therefore, by changing the number of auxiliary capacitors C2 and C3 in parallel with the main capacitor C1, the load current and power are adjusted.

The a.c. source 12 and lamp 11 are electrically connected to terminals 13-14 and 15-16, respectively. Capacitor C1 is connected between terminals 13 and 15. For each auxiliary capacitor C2 and C3, there is a switching means 17 and 19, respectively, electrically connected between terminal 15 and one terminal of each auxiliary capacitor C2 and C3. The remaining terminal of each auxiliary capacitor C2 and C3 is connected to terminal 13. Terminals 14 and 16 are electrically connected directly together.

Each of the switching means 17 and 19 provides a low resistance, bidirectional current conduction path between terminal 15 and that terminal of each auxiliary capacitor C2 furthest from terminal 13. More specifically each of switching means 17 and 19 comprise a unidirectional conducting device 18, that is a rectifier such as a diode, electrically connected in parallel with an active switching devices 21 and 22. The active switching devices 21 and 22 can be any active device which conducts in the electrically opposite direction of unidirectional device 18 or bidirectionally. The active switching devices 21 and 22, preferably, should be switched to a conductive and non-conductive state in response to a control signal from a control logic means 20; such control logic means being well known in the art. The active switching devices 21 and 22 can be, but is not limited to, a silicon controlled rectifier (SCR) 21 or a transistor such as a junction or field-effect transistor (FET) 22.

To prevent undesirable conduction and limit the current flow through each switching device 17 and 19, each of the switching devices 17 and 19 is preferably controllably switched "on" by control relative voltage potential between V1 across the main capacitor C1 and the voltage potentials V2 and V3 across their respective auxiliary capacitor C2 and C3, are approximately equal and/or at approximately the maximum voltage of the a.c. source 12 waveform and thereby substantially eliminate any circulating current flowing between auxiliary capacitors C2 and main capacitor C1.

Additionally each switching means 17 and 19 comprising a transistor as the active switching device 19 is capable of operating at a temperature of at least 130° centigrade as compared to prior art means, such as a triac, which has a maximum operating temperature of approximately 100° centigrade. That is, a typical triac at temperatures of approximately 100° centigrade or above will switch to and maintain a conductive state in the absence of a gate signal resulting in unacceptable operation thereof.

As previously disclosed the present invention provides a ballast means 10 which controls the power supplied to the incandescent lamp 11 by varying the capacitance electrically in series therewith. More specifically, the total capacitance, electrically in series with the incandescent lamp 11, is equal to the parallel combination of the main capacitor C1 and all auxiliary capacitors C2 and C3 which have the switching means 17 and 19, respectively in a conductive state. Thus by varying the number of auxiliary capacitors C2 and C3 which have their switching means 17 in a conductive state, the total capacitance in series with the incandescent lamp can be varied and thereby provide a ballast means 10 which regulates the power supplied to the incandescent lamp 11 and therefore regulates the lamp filament temperature.

Additionally each switching means 17 and 19 can switch and thereby electrically connect and disconnect an auxiliary capacitor in parallel to the main capacitor for one or more complete cycles of the a.c. source 12 waveform.

It should also be noted that the auxiliary capacitors C2 and C3 can each have the same capacitance as or different capacitances from each other. Each auxiliary capacitor C2 or C3 can also be switched independently of each other. In a preferred embodiment the main capacitor C1 has a capacitance of approximately 25 microfarads, the total auxiliary capacitance is 25 microfarads, the a.c. source 12 is at approximately 120 volts, 60 hertz and the lamp is operating at approximately 36 volts, 60 watts. The number of auxiliary capacitors C2 and C3 electrically connected in parallel with the main capacitor C1 and the capacitance of each capacitor can vary according to a number of factors including the a.c. source 12 voltage magnitude, desired lamp current, lamp brightness, lamp operating voltage, etc.

Figure 2:
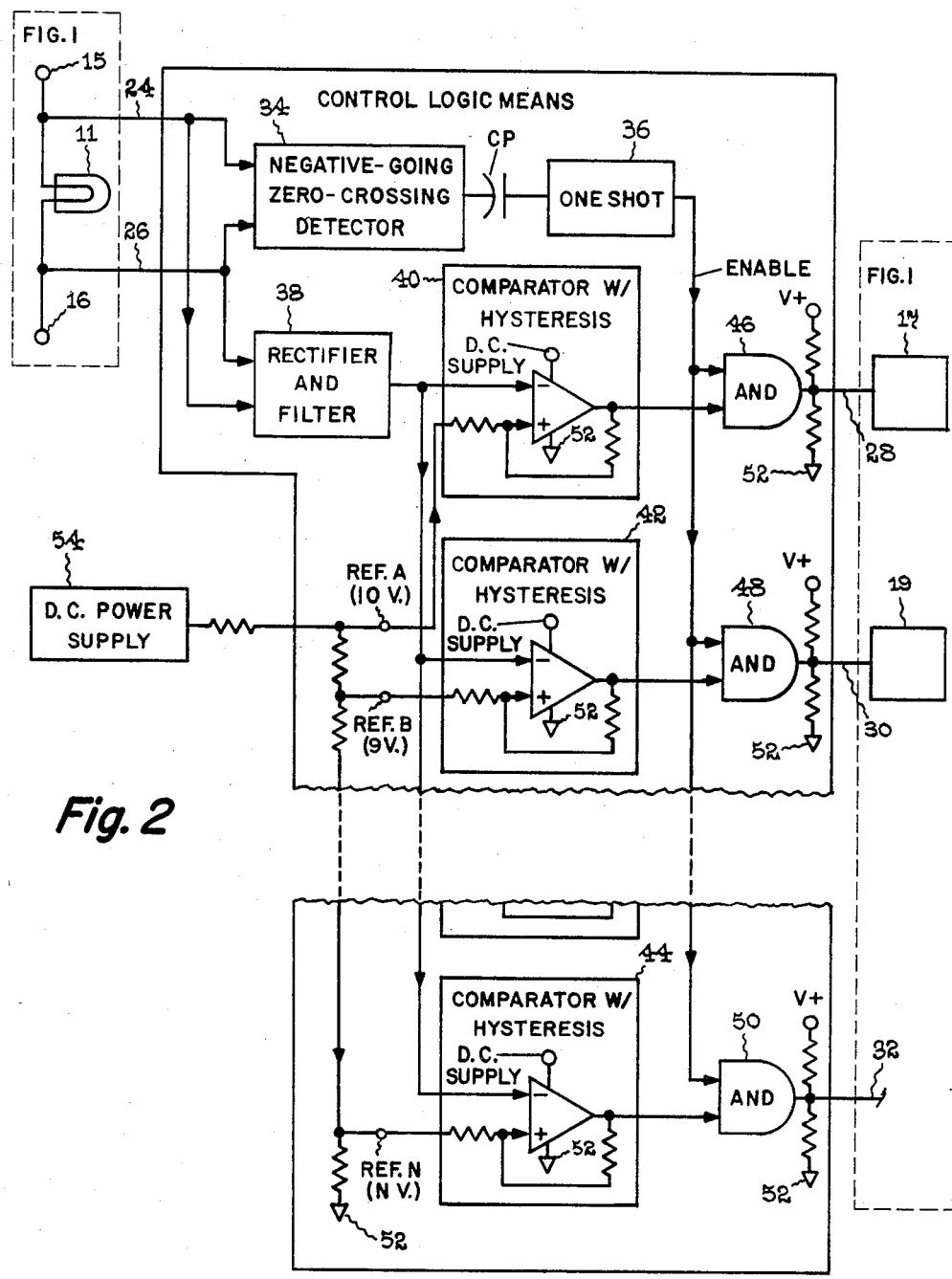
FIG. 2 is a block diagram of the control logic means of FIG. 1.

The operation of the switching means 17 and 19 in response to the control logic means 20 may be described with reference to FIG. 2. FIG. 2 shows the control logic means 20 as comprised of a plurality of elements, each element having a reference number and a circuit function as given in Table I.

TABLE 1

| Reference Number | Circuit Function |
|---|---|
| 34 | Negative-Going Zero-Crossing |
| 36 | One Shot |
| 38 | Rectifier and Filter |
| 40, 42 and 44 | Comparator with Hysteresis |
| 46, 48 and 50 | AND Circuit |

The input signal to the control logic means 20 of FIG. 2 is supplied by signal paths 24 and 26 arranged across the filament 11, whereas, the output signals of the control logic means 20 are routed by means of signal paths 28 and 30 to switching means 17 and 19 respectively of FIG. 1. The control logic means 20 may also generate one or more output signals applied to one or more signal paths 32 shown in FIGS. 1 and 2 in a discontinuous manner. The practice of this invention contemplates that the one or more signal paths 32 may be respectively routed to one or more switching means (not shown), similar to the switching means 17 and 19 of FIG. 1, to control the conductive states of the switching means, which, in turn, interconnect respective additional auxiliary capacitors (not shown), similar to the auxiliary capacitors C2 and C3 of FIG. 1, into the circuit of FIG. 1.

The input signal paths 24 and 26 are routed to, (1) the negative-going zero-crossing detector 34, and (2) the rectifier and filter 38. The output of the detector 34 is routed to the one shot 36 by means of a coupling capacitor CP. The output of the one shot 36 is routed to a first qualifying input of each of AND circuits 46, 48, and 50. The output or enable signal of the one-shot 36 is typically of a 10 millisecond duration so as to maintain proper conduction of the switching means for a complete half-cycle of the A.C. source 12. The output of the rectifier and filter 38 is applied as a first input to each of the comparators with hysteresis 40, 42, and 44.

The comparators 40, 42, and 44 each have a second input developed from a conventional D.C. power supply 54 which is located external to the control means 20. The second inputs to the comparators 40, 42, and 44 are respectively REF. A, REF. B, and REF. N. REF. A and REF. B have respective typical values of 10 volts D.C. and 9 volts D.C., whereas, REF. N has a D.C. voltage of a relatively low value selected to establish the response characteristic of the control logic means 20 to changes sensed for the condition of the current flowing through filament 11 to be described hereinafter.

The comparator 40, 42, and 44 are shown in schematic form in FIG. 2 as comprised of a triangular shaped comparator having a resistive network arranged at the output stage so as to develop a hysteresis type of output. The comparators 40, 42, and 44 each have one of their power terminals connected to the D.C. supply 54 and their other power terminal connected to the circuit common 52 of the control logic means 20. The output stage of the comparators assures that the occurrence of an output signal has hysteresis to prevent unwanted "dithering" or instability of the comparator. The generation of a hysteresis output is well known and is described on page 346 of the Op-Amp Applications Handbook, author H. W. Fox, published January 1978 by Tab Books of Blue Ridge Summit, Pa.

The output of the comparators 40, 42, and 44, are respectively applied as a second qualifying input to AND circuits 46, 48, and 50. The output stage of each of the AND circuits 44, 46, and 50, have a pull-up resistor arrangement to render each of the respective switching means conductive in response to the non-qualified condition of each AND circuit 46, 48, and 50.

The qualified condition of each of the AND circuits 46, 48, and 50 renders an output signal to respectively cause the respective switching means 17, 19 and the switching means described with regard to signal path 32, to be rendered non-conductive, which, in turn, disconnect the respective auxiliary capacitor associated with the switching means from the circuit of FIG. 1. AND circuits 46, 48, and 50 are qualified during the presence of both the enable signal of the one-shot 36 and an output signal developed by comparators 40, 42, and 44, respectively.

The presence of the enable signal is in response to the negative-going zero-crossing detector 34 sensing that the current flowing through the filament 11 is in its zero condition, and which zero condition is indicative that the voltage of the A.C. source 12 is at its peak condition typically 170 volts. Negative-going zero-crossing detectors are well-known and reference may be made to the previously mentioned Op-Amp Application Handbook, pages 344 and 345 for a description of one such detector.

At the 170 volt peak condition, the voltage impressed across the main capacitor C1 and the auxiliary capacitors C2 and C3 are substantially the same value, that is 170 volts, and if the switching means 17 and 19 are rendered conductive, in response to the output condition of the comparators 40, 42, and 44, any circulating current flowing between the auxiliary capacitors C2 and C3 and the main capacitor C1 is substantially eliminated. The output condition of the comparators may be described with reference to Table 2.

the D.C. voltage of REF. N. For this example, the set of currents flowing through the auxiliary capacitors C2, C3, and CN (associated with signal path 32) shown in Table 2 is (1) Yes (current flow), (2) No (no current flow) and (3) No (no current flow).

As previously mentioned, the relatively small range of lamp voltage can be maintained while the A.C. source 12 current is varied over a predetermined range, for example 20%. This maintainability of the lamp voltage is realized by the control logic means of FIG. 2 having the response shown in Table 2. The maintainability is achieved by the selection of the number of reference voltages such as Ref. N supplied by the D.C. power supply 54, and the number of comparators such as 44. For example, if four sequential REF. N are selected so that sequential D.C. voltages of 1.0, 2.0, 3.0, and 4.0 are respectively routed to four comparators, each respectively controlling four switching means having associated auxiliary capacitors, then the control logic means 20 will sequentially disconnect four separate auxiliary capacitors from the circuit of FIG. 1 when the D.C. voltage developed by the rectifier and filter 38 rises from somewhat less than 1.0 volt to somewhat greater than 4.0 volts. This sequential switching in response to relative small changes of the D.C. voltage developed by the rectifier and filter 38 and indicative of relatively small changes of the A.C. source 12 voltage variations associated with filament 11 maintains a smooth and relatively small range of lamp voltage.

Thus the present invention as disclosed heretofore is able to adjust for a.c. source voltage variations. That is, as the a.c. source 12 voltage increases or decreases in magnitude, the auxiliary capacitors C2 and C3 can be decreased or increased, respectively, to maintain a substantially constant flow of current or power or both through lamp 11.

Furthermore the load current, power, and brightness can be established both by manual not shown or automatic adjustment of each active switching device 19. More particularly, it is to be understood that a control

TABLE 2

| | CONTROL LOGIC MEANS 20 RESPONSE | | | | | | | | |
|---|---|---|---|---|---|---|---|---|---|
| Filament 11 Current Condition | REF. | | | Output States Of Comparators | | | Current Flowing thru Auxiliary Capacitors | | |
| | A | B | N | 40 | 42 | 44 | C2 | C3 | CN |
| Minimum | Less than | Less than | Less than | Off | Off | Off | No | No | No |
| Intermediate | Greater than | Less than | Less than | On | Off | Off | Yes | No | No |
| Maximum | Less than | Less than | Less than | On | On | On | Yes | Yes | Yes |

Table 2 generally shows the response of the control logic means to three conditions of the current flowing through filament 11: (1) minimum, (2) intermediate, and (3) maximum currents. The output states shown in Table 2 of the comparators are controlled by the voltage differential between: (1) the D.C. voltage developed by rectifier and filter 38 shown in FIG. 2 indicative of the current flowing through the filament 11; and (2) the D.C. voltage level of REFS. A, B, and N.

For example, the set of the output states (1) ON, (2) Off, (3) Off of the comparators 40, 42, and 44 respectively, correspond to the set: (1) Greater than, (2) Less than, and (3) Less than and are indicative that the D.C. voltage developed by the rectifier and filter 38 of FIG. 2 is (1) Greater than the D.C. voltage of REF. A, (2) Less than the D.C. voltage of REF. B, and (3) Less than logic circuit 20 can be used, having a feedback signal fed into, for example, the gate of an SCR (21) or FET (22) to turn the active switching device to a conductive or non-conductive state and thereby automatically adjust the total capacitance between terminals 13 and 15. Such a feedback signal as discussed with reference to FIG. 2, is responsive to the current flow through load 11.

Still further and as disclosed in U.S. patent application Ser. No. 379,412, by the present invention utilizing a capacitively ballasted means of providing low voltage across the lamp 11, undesirably high levels of electromagnetic interference are avoided as compared to the prior art. Additionally, and in contrast to U.S. patent application Ser. No. 379,412, the present invention can be manufactured at a lower cost and, if a transistor is used as the active switching device, can have a higher maximum operating temperature.

Therefore, while the present invention has been shown and described in a preferred embodiment, various other embodiments and modifications thereof will become apparent to persons skilled in the art and will fall within the spirit and scope of the invention as defined in the following claims.

What I claim as new and desire to secure by Letters Patent of the United States is:

1. A ballast means controlling power from an alternating current source to an incandescent lamp, having a filament, at a voltage magnitude that is less than the alternating source voltage comprising:
   (a) a first capacitive element electrically serially connected to said lamp which together are across the ballast means input terminal;
   (b) at least one auxiliary capacitive element
   (c) a control means connected across the filament of said lamp generating discrete control signals in response to conditions of the current flowing through the filament; and,
   (d) transistor switching means capable of operating at a temperature of at least 130° C., responsive to said control means so as to be rendered conductive for one or more complete cycles of alternating current in response to said control signal, for selectively and individually electrically connecting each auxiliary capacitive element in parallel across said first capacitive element, wherein each auxiliary capacitive element has serially connected thereto a switching means comprising a unidirectional conducting device connected electrically in parallel with an active switching device.

2. A ballast means as claimed in claim 1 wherein said unidirectional conducting device is a diode.

3. A ballast means as claimed in claim 1 wherein each of said active switching devices is selected from the group consisting of a silicon controlled rectifier, junction transistor and field-effect transistor.

4. A ballast means as claimed in claim 1 wherein each of said active switching devices is switched to a conductive and non-conductive state in response to a control signal.

5. A ballast means as claimed in claim 1 wherein said switching means are switched independently of each other.

6. A ballast means controlling power from an alternating source to an incandescent lamp, having a filament, at a voltage magnitude that is less than the alternating voltage source comprising:
   (a) a first capacitive element electrically connected to said lamp which together are across the ballast means input terminal;
   (b) at least one auxiliary capacitive element;
   (c) a control means connected across the filament of said lamp generating a control signal in response to the conditions of the current flowing through the filament;
   (d) transistor switching means capable of operating at a temperature of at least 130°, responsive to said control means so as to be rendered conductive for one or more complete cycles of alternating current in response to said control signal, for electrically connecting each auxiliary capacitive element in parallel across said first capacitive element, wherein each auxiliary capacitive element has serially connected thereto a switching means comprised of a unidirectional conductor device connected electricaly in parallel with an active switching means, and further;
   wherein each auxiliary capacitive element has values selected so that at the time it is electrically connected in parallel with said first capacitive element by said switching means in response to said control means, the voltage potential across each of auxiliary capacitor element, which is electrically connected in parallel with said first capacitive element, is approximately the same as the voltage potential across said first capacitive element.

7. A ballast means as claimed in claim 1 wherein said incandescent lamp is operating at approximately 36 volts, 60 watts; said first capacitor has a capacitance of approximately 25 microfarads; said one or more auxiliary capacitors have a total capacitance of approximately 25 microfarads; and said alternating current source voltage is approximately 120 volts at 60 hertz.

* * * * *